United States Patent Office 3,296,293
Patented Jan. 3, 1967

---

3,296,293
PREPARATION OF CARBOCYCLIC DINITRILES
Thomas H. Strickland and Charles J. Kibler, Kingsport, Tenn., assignors to Eastman Kodak Company, Rochester, N.Y., a corporation of New Jersey
No Drawing. Filed Nov. 29, 1963, Ser. No. 327,071
11 Claims. (Cl. 260—464)

This invention relates to a process for the preparation of carbocyclic dinitriles and more particularly to a process for the preparation of 1,3-cyclohexanedicarbonitrile and 1,4-cyclohexanedicarbonitrile by dehydration of the diammonium salts or diamides of the corresponding 1,3-cyclohexanedicarboxylic acid or 1,4-cyclohexanedicarboxylic acid. Specifically, the invention relates to a catalytic process for the preparation of 1,3-cyclohexanedicarbonitrile and 1,4-cyclohexanedicarbonitrile.

In our copending application in the names of Thomas H. Strickland and Charles J. Kibler, Serial No. 274,841, filed April 22, 1963, entitled "Synthesis of Amines from Carbocyclic Carboxylic Acids and Their Esters," we have described a process for the preparation of mono- and diamines useful in the preparation of many polyamides and related compounds which themselves are useful in the production of such products as filaments, fibers, yarns, films and other forms of molded, extruded or other mechanically shaped objects. For example, as set forth in the U.S. patent to Bell, Smith and Kibler, 3,012,994, 1,4-cyclohexanebis(methylamine) can be employed in the production of linear highly polymeric polyamides by condensation with one or more bifunctional carboxy compounds containing from 1 to 20 carbon atoms such as a straight-chain aliphatic dicarboxylic acid containing from 6–12 carbon atoms, isomers of such compounds which contain one or two methyl or ethyl radicals attached to the principal carbon chain, the various isomers of cyclohexanedicarboxylic acid, the various isomers of benzenedicarboxylic acid and other aromatic and cycloaliphatic dicarboxylic acids. Such polyamides have excellent physical and chemical properties which render them especially useful in the manufacture of fibers, yarns, fabrics, films, extruded objects, supports for photographic emulsions, molding compositions, coating compositions, electrical insulation and other products.

The present invention provides a novel process of producing non-aromatic carbocyclic dinitriles typified, for example, by 1,3- or 1,4-cyclohexanedicarbonitriles which may be employed as intermediates in the production of the 1,3- or 1,4-cyclohexanebis(methylamines) referred to in the above-mentioned U.S. patent to Bell, Smith and Kibler No. 3,012,994, the preparation of which amines is described in our copending application Serial No. 274,841 above referred to.

It is known in the prior art to prepare aliphatic nitriles and aromatic nitriles by contacting suitable nitrile-producing materials with a dehydration catalyst in the presence of ammonia. Because of the generally low boiling and melting points of the aliphatic compounds, no particularly difficult process problems are involved. On the other hand, boiling points and melting points of aromatic nitrile-producing materials require higher temperatures to render them fluid, either in molten or vapor form, preparatory to introducing them into a catalytic reaction zone.

U.S. Patent 2,808,426 describes the preparation of aliphatic mono-nitriles by contacting aliphatic substances such as fatty acids derived from tallow, coconut oil, soybean oil, and the like in a liquid phase with ammonia and subsequently passing the resulting partially reacted mixture into a second reactor wherein at least 70 percent of the initial reaction mixture is converted to nitrile and finally passing the predominantly nitrile-containing reaction mixture into a third zone containing a dehydration catalyst for a sufficient period to convert substantially all of the reaction mixture to the desired nitrile.

U.S. Patent 2,857,416 and British Patent 821,404, on the other hand, disclose similar stepwise processes for the preparation of aromatic dinitriles from iso- and terephthalic acids. In addition, British Patent 821,404 discloses a process for the selective hydrogenation of the nitrile groups of an aromatic dinitrile to the corresponding bismethylamines without hydrogenation of the aromatic nucleus. It is clear from these disclosures that no reference is made to the preparation of cycloaliphatic dinitriles by contacting non-aromatic, carbocyclic nitrile-producing material with a dehydration catalyst in the presence of ammonia. Neither is such a process described in any of the chemical literature or other patents of which we are aware. As will be more fully set forth hereinafter, we have found that certain cycloaliphatic nitrile-producing materials, i.e., cycloaliphatic carboxylic acids, ammonium salts of such acids, esters of such acids, and amides thereof, may be introduced into a catalytic zone in the presence of ammonia, and there may be recovered therefrom the desired cycloaliphatic dicarbonitrile in excellent yields. It should be noted, however, that the preparation of 1,4-cyclohexanedicarbonitrile by first preparing the acyl halide of the acid by reacting 1,4-cyclohexanedicarboxylic acid with thionyl chloride, treating the resulting halide with ammonia, to obtain the 1,4-cyclohexanedicarboxamide which is dehydrated by any convenient method to obtain therefrom the desired 1,4-cyclohexanedicarbonitrile is known. This method is described by R. Malachowski, J. J. Wasowska and S. Jozkiewicz in Ber. vol. 71, page 759 (1938), although the preparation of the corresponding 1,3-cyclohexanedicarbonitrile is not referred to.

This invention has as its principal object to provide a process for the preparation of non-aromatic carbocyclic dinitriles.

A further object is to provide a new class of chemical compounds in the form of non-aromatic carbocyclic dinitriles which have particular usefulness in the production of non-aromatic carbocyclic bis(methylamines).

A still further object is to provide an efficient and simple catalytic process for the production by either batch or continuous procedures of non-aromatic carbocyclic dinitriles.

A still further and specific object is to provide a process of producing 1,3- or 1,4-cyclohexanedicarbonitriles.

Other objects will appear hereinafter.

These objects are accomplished by the following invention which in its broader aspects may be defined as a vapor phase catalytic process wherein any one of several different starting materials, that is, either the 1,3- or 1,4-cyclohexanedicarboxylic acids themselves, the diammonium salts of such acids or the amides or esters of such acids, are converted in the presence of ammonia and a dehydration catalyst to the corresponding dinitriles. In such a process the diammonium salt may be brought into direct contact with a dehydration catalyst in the presence of ammonia, whereupon the salt undergoes two successive dehydrations, first to the diamide and then to the dicarbonitrile. In a preferred embodiment of the invention, in which much higher yields are obtained, 1,3- or 1,4-cyclohexanedicarbonitrile may be produced by continuously charging 1,3- or 1,4-cyclohexanedicarboxylic acid or the diammoniaum salt of 1,3- or 1,4-cyclohexanedicarboxylic acid, either as a solid or in an aqueous solution, from a suitable source into the melt zone or chamber of a reactor which is maintained at a temperature within the range of 200° C. to 275° C. and preferably within the range of 225° C. to 250° C., continuously supplying gaseous ammonia to the melt zone, in contact with the reactant in sufficient quantities to convert the acid (in case the acid is the starting material) to the corresponding ammonium salt and in any case, under the influence of heat, to bring about such chemical transformations in the ammonium salt as to form a molten and relatively fluid mass comprising unreacted portions of the reagent and partially reacted portions of the reagent comprising ammonia derivatives of the reagent; continuously passing the molten mass and ammonia from the melt zone to a catalytic dehydration zone; contacting the molten mass in the dehydration zone with a dehydration catalyst, for example, alumina, at a temperature between 300° C. and 485° C. to remove water and to convert all unreacted reagent and partially reacted reagent from the melt zone to the desired 1,3- or 1,4-cyclohexanedicarbonitrile.

We have found that when one starts with the diammonium salt of the acid, or starts with the acid itself in the presence of ammonia (which of course results in immediate formation of the salt) the use of the melt step not only greatly facilitates the handling of the material and its conveyance into contact with the catalyst in the dehydration zone, but also results in substantially increasing the yields of dicarbonitrile product desired. For example, if one brings the solid diammonium salt into direct contact with the dehydration catalyst, yields of only about 15-25 percent of the dicarbonitrile product is obtained, whereas if one employs an initial melting step, followed by the catalytic dehydration step, yields of the order of 75-90 percent or more are obtained, an approximately three fold or more increase. What we wish to emphasize in this connection is that while our process is operable as a single one step catalytic process where the starting materials are brought in contact with the catalyst in the presence of ammonia, it is preferable to employ the two step process when starting with the acid itself or the diammonium salt of the acid. On the other hand, as will be more fully set forth hereinafter, when employing the diamide of the acid, the melt step has been found to be unnecessary and excellent yields of the order of 75-90 percent may be obtained by bringing the diamide in solid form into immediate contact with the dehydration catalyst in the presence of ammonia at the temperatures indicated above.

Dehydration catalysts which may be employed in accordance with the invention are various aluminum oxides ($Al_2O_3$), boron phosphate and other dehydration catalysts well known to the art. The catalysts may be employed in pelleted, lump or any physical form suitable for use in the particular reactor selected for carrying out the desired reactions. The catalysts may be a supported or unsupported catalyst.

The use of a melt stage (in the case of solid starting materials or aqueous solutions thereof) and the employment of an atmosphere of ammonia is primarily for the purpose of assuring that any acidic materials present will be totally converted to and maintained as the corresponding ammonium derivatives. For example, in the presence of ammonia 1,3- or 1,4-cyclohexanedicarboxylic acid will be converted to the ammonium salt but since this is a reversible reaction, it is necessary to maintain an excess of ammonia at all times to assure that the ammonium salt remains in the reaction mass, as such, and does not revert to the acid.

Depending upon the particular starting material selected for carrying out our process, the process may under certain circumstances be operated as a direct one-step rather than a two-step process as described above. For example, if an ester of 1,3- or 1,4-cyclohexanedicarboxylic acid is employed as the starting material, the ester material may be brought directly into contact with the catalyst and ammonia at an appropriate temperature, such as a temperature within the range of 400° C. to 485° C. In such a case the ammonia performs two functions, namely, (1) to convert the ester first to the ammonium salt and then to the dinitrile and (2) to protect the dicarbonitrile product from dehydrogenation and decyanolation of the non-aromatic carbocyclic nucleus.

When employing the preformed diamides of 1,3- or 1,4-cyclohexanedicarboxylic acid, this type of raw material, both of which are solids at room temperature, may be fed, in any appropriate particle size, and without a first melt step, together with ammonia, directly to the catalytic dehydration zone at an appropriate temperature, such as a temperature within the range of 350° C. to 450° C., to convert the diamide directly to the corresponding dicarbonitrile. Here again the presence of ammonia protects the dicarbonitrile product from dehydrogenation and decyanolation of the non-aromatic carbocyclic nucleus.

It will be noted from the preceding description of our invention that in all cases ammonia is present during the various conversions of the starting material to the desired dicarbonitrile product. The beneficial effects and increased yields of dicarbonitrile obtained by the employment of ammonia at all times, in accordance with our invention, are clearly illustrated in the following table which shows the instability of 1,4-cyclohexanedicarbonitrile, both in the presence of a dehydration catalyst and in the absence of ammonia, as compared to the relative stability of this compound when ammonia is present.

STABILITY OF 1,4-CYCLOHEXANEDICARBONITRILE STABILITY DATA AT 450° C.[1]

| Run No. | Catalyst | | Mole Ratio Ammonia: 1,4-Cyclohexane dicarbonitrile | 1,4-Cyclohexane dicarbonitrile, Percent Recovery |
|---|---|---|---|---|
| | Composition | Pretreatment | | |
| 1 | $Al_2O_3$ | None | 0.5:1 | 91 |
| 2 | $Al_2O_3$ | do | 0:1 | [2]55 |
| 3 | $Al_2O_3$ | $NH_3$[3] | 0:1 | 79 |

[1] Contact time 0.8 seconds.
[2] 0.9 g. Benzonitrile recovered, probably formed by a combination of dehydrogenation and partial decyanolation.
[3] One hour at 450° C.

Our invention will be more readily understood by reference to the following equations. The overall reaction for obtaining carbocyclic dinitriles in accordance with the invention may conveniently be illustrated by the reaction between 1,3- or 1,4-cyclohexanedicarboxylic acid and ammonia:

(1) $C_6H_{10}(COOH)_2 + 2NH_3 \rightarrow C_6H_{10}(CN)_2 + 4H_2O$

In transforming the various starting materials referred to above into dinitriles in accordance with our invention, the following reactions are believed to take place with the indicated resulting products:

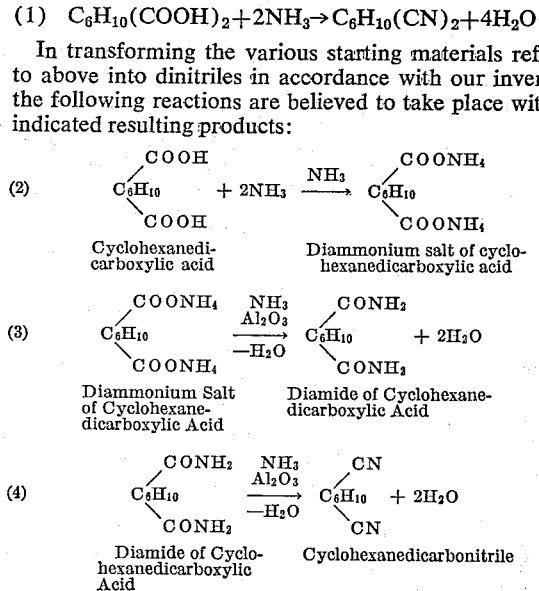

Equation 2 above illustrates the case in which 1,3- or 1,4-cyclohexanedicarboxylic acid is employed as the starting material. In this case the acid is converted, in the presence of ammonia, to the corresponding ammonium salt which is subsequently carried through the melt stage and then through the catalytic dehydration stage.

Equation 3 illustrates the conversion of the ammonium salt of the 1,3- or 1,4-acid to the corresponding diamide which is then converted to the corresponding dinitrile in accordance with Equation 4. In such a case it will be evident that the salt undergoes two successive dehydrations and the diamide form exists, if at all, only momentarily in the conversion as an intermediate. If, on the other hand, one starts with a preformed diamide, the first or melt stage is not necessary and the material may be introduced directly into the catalytic dehydration zone and converted to the corresponding dinitrile as indicated in Equation 4.

The following equation is given to illustrate the transformation of simple diesters of 1,3- and 1,4-cyclohexanedicarboxylic acids to the corresponding ammonium salts as an additional source of this starting material for the production of carbocyclic dinitriles in accordance with our invention.

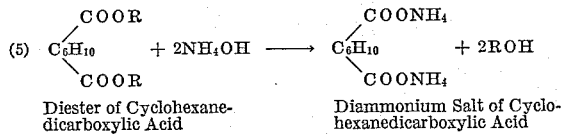

R may be a lower alkyl group containing 1-4 carbon atoms such as methyl, ethyl, propyl, butyl, and the like.

In a similar manner a diester of cyclohexanedicarboxylic acid may be reacted with ammonia to provide a source of the corresponding diamides of such acids, which material may be directly converted in a one-step process to the corresponding dinitrile:

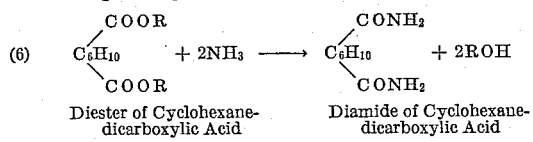

R is a lower alkyl group containing 1-4 carbon atoms such as methyl, ethyl, propyl, butyl, and the like.

It will be evident from the above equations that the basic starting material for obtaining the dinitriles of the present invention is the diammonium salt of either 1,3- or 1,4-cyclohexanedicarboxylic acids or their esters and that this is true whether one employs the salt as a preformed product, as such, or depends upon its formation in situ when the acid or the ester is introduced into the melt zone in the presence of ammonia as in the two-stage process.

Likewise, referring to Equations 3 and 4, the starting material is the diammonium salt of 1,3- or 1,4-cyclohexanedicarboxylic acid, which undergoes two successive dehydrations, first to the diamide and then to the dinitrile. As indicated above, if one starts with the acid itself, the two-stage procedure is employed. As indicated the diamide exists, if at all, only as a momentary intermediate and is immediately dehydrated to the dinitrile. As stated, one may start with preformed diamide itself and convert the diamide by dehydration directly to the dinitrile.

As described above, in certain instances our process for producing 1,3-cyclohexanedicarbonitrile or 1,4-cyclohexanedicarbonitrile can be carried out in a single catalytic dehydration step. In other instances the process is a two-step process, the first of which involves melting the starting material in the presence of ammonia and the second of which is a catalytic dehydration step also carried out in the presence of ammonia. Whether one employs the single step or two-step process will depend on what material is selected as the starting material. For example, when employing a substance which is a solid at room temperature such as the 1,3- or 1,4-cyclohexanedicarboxylic acid itself or the salts of such acids, an initial melt stage would be required to bring the solid material into an easily flowable condition. On the other hand if one employs an ester of the acid which is a liquid at room temperature, of course, no melting step is required. Although diamides of the 1,3- or 1,4-cyclohexanedicarboxylic acid are also solids at room temperature, we have found that no melting is required and the material may be passed directly into contact with the dehydration catalyst to form corresponding dicarbonitrile, reaction being practically instantaneous.

Our invention will be more fully understood by a further discussion of the conditions of operation of our process as set forth in the preceding description. For convenience of discussion, four possibilities are set forth under separate headings below.

*(1) Solid starting materials—single step—no melt*

Assuming that one employs the diamide of 1,3- or 1,4-cyclohexanedicarboxylic acid, this material, in any convenient physical form, such as powder, pellets, lumps or granules, may be fed at the desired rate, together with an atmosphere of ammonia, directly into contact with a suitable dehydration catalyst such as granulated activated alumina ($Al_2O_3$) in an appropriate vessel which is maintained at a temperature within the range of 300 to 485° C. and preferably within the range of 375 to 400° C. In this case the reaction takes place with exceeding rapidly and the product is removed as a vapor in the off-gas stream, condensed by cooling and collected in an appropriate receiver as a solid. Excellent yields of dicarbonitrile product are obtained in this manner. In view of the nature of the material and the fact that it reacts immediately in the presence of the catalyst, no melt phase is required.

*(2) Liquid starting materials—single step—no melt*

An example of operation employing a liquid is the use of the simple or lower alkyl diesters of 1,3- or 1,4-cyclohexanedicarboxylic acid as the starting material. In this case the diester, which is a liquid at room temperature, would be metered into a suitable reactor, together with sufficient ammonia, not only to convert the ester to the diammonium salt of the ester, but also to provide an excess of ammonia in the entire environment. The catalyst may be the same as described in the preceding section and the temperature is maintained within the range of 350 to 485° C. and preferably within the range of 375 to 450° C. Under these conditions the diamide so produced (see Equations 3 and 4) is instantaneously converted to the desired 1,3- or 1,4-cyclohexanedicarbonitrile and these products may be removed as a vapor in the off-gas stream. As before, the dicarbonitrile is condensed and collected as a solid product in excellent yields. It will be observed that here no melt phase is required because the starting material is a liquid at room temperature.

*(3) Solid starting material—two steps—with melt*

Assuming that one starts with the ammonium salt of 1,3- or 1,4-cyclohexanedicarboxylic acid as previously prepared in the solid state. It is first necessary to melt the material to bring it into a condition such that it will flow readily and thus can be subsequently conveyed into the catalytic zone in which dicarbonitrile formation takes place. The material is accordingly introduced into the melt zone of a suitable baffled reactor, in the presence of ammonia, and subjected to a temperature in this melt zone within the range of 200 to 275° C. and preferably within the range of 225 to 250° C. whereby the ammonium salt is formed in situ. In the second step the melt, consisting of unreacted portions of the reagents and partially reacted portions of the reagents comprising ammonium derivatives of the reagents, is conveyed further through the reactor into a catalytic zone thereof where it comes in contact with the dehydration catalyst, which may be activated alumina ($Al_2O_3$) maintained at a temperature within the range of 300–450° C. and preferably within the range of 300–400° C. An atmosphere of ammonia is also maintained in this catalytic zone so that the dicarbonitrile product is protected from dehydrogenation and decyanolation of the non-aromatic carbocyclic nucleus. The dicarbonitrile product in vapor form then passes to a condensing zone where it is condensed and collected as a solid in excellent yields.

It will be evident to those skilled in the art to which this invention relates that once the process is started employing the diammonium salt and it is brought into a fluid condition as above described, one may, if desired, simply feed 1,3- or 1,4- cyclohexanedicarboxylic acid, which are solids at room temperature, into the reactor instead of introducing the diammonium salts as such. In this case, in the presence of ammonia, salt formation will take place in situ almost immediately and the salts formed will undergo the same transformation as if introduced in salt form initially. The material thus formed in situ will then pass into the catalytic zone of the reactor where the dicarbonitrile will be formed as above described.

(4) *Liquid starting material—two steps—solution and melt*

Under circumstances where it may be desirable to employ highly fluid systems, the starting material may be in the form of an aqueous solution of the ammonium salt of either 1,3- or 1,4-cyclohexanedicarboxylic acid. In such case, the solution will be introduced into the melt zone of the reactor, together with an atmosphere of ammonia, and subjected to a temperature of 200 to 275° C. which simultaneously removes the water and brings the ammonium salt to the same molten condition it would assume had the dry salt been used initially as in Section 3 above. In this molten condition, it has sufficient fluidity to be readily conveyed or caused to flow to the catalytic zone of the reactor. In this zone the molten ammonium salt is brought into contact with an activated alumina catalyst maintained at a temperature within the range of 300–450° C. and preferably within the range of 300–400° C. As in the case of initial employment of solid starting materials as described in Section 3, an atmosphere of ammonia is maintained in the catalytic zone in order to protect the dicarbonitrile product from dehydrogenation and decyanolation of the non-aromatic carbocyclic nucleus. The product as before is obtained in the vapor phase, is condensed and obtained as a solid product in high yields.

In the following examples and description we have set forth several of the preferred embodiments of our invention but they are included merely for purposes of illustration and not as a limitation thereof.

EXAMPLE I

A tubular reactor was constructed of borosilicate glass 22 inches long, 25 mm. in outside diameter and approximately 22 mm. in inside diameter. The upper 4 inches of the reactor was baffled so as to provide a retaining melt zone to collect and contain the incoming starting material for a sufficient period of time to permit the initial transformations necessary to convert the material to a fluid mass and simultaneously to permit any of the already fluidized material to flow down stream into the lower portion of the reactor containing the dehydration catalyst. The melt zone was heated to 250° C. with a 250 watt electric heater. The temperature of the melt zone was controlled by a Wheelco Capacitrol having a thermocouple located in a thermowell inside the melt zone and in contact with the material contained therein.

The lower section of the reactor was 16 inches long. A borosilicate glass thermowell, 8 mm. in outside diameter extended the entire length of the catalytic reaction zone of the reactor tube. The catalyst bed, composed of granulated activated alumina ($Al_2O_3$) of 8–14 mesh, was conveniently positioned in the central segment of the reactor between top and bottom layers of 3 mm. diameter glass beads. The portion of the reactor containing the catalyst bed was heated to 375° C. by means of a 750 watt electric furnace, modified with booster elements, where necessary, to maintain a uniform temperature throughout the catalyst bed. A stainless steel sleeve having a ¼ inch wall thickness provided the surface for transfer of heat from the furnace to the reactor. The temperature of the furnace was controlled by a Wheelco Capacitrol with which two thermocouples were used simultaneously. One thermocouple was located in a thermowell in the stainless steel sleeve and other in the thermowell of the reactor. The temperature in the reactor was recorded by a Leeds and Northrup potentiometer equipped with a probe-type thermocouple located inside the thermowell of the reactor.

The lower end of the reactor tube was connected by means of a gas-tight joint to a round bottom flask as a receiver. The receiver was further provided with a condenser through the central passage of which ammonia and any uncondensed by-product gaseous materials were led from the system.

The 1,4-cyclohexanedicarboxylic acid to be reacted was fed at the rate of 0.058 mole per hour, concurrently with anhydrous ammonia, introduced at a rate of 0.174 mole per hour, into the melt zone whereby the diammonium salt is formed in situ. A melt was formed comprising unreacted portions of the reagents and partially reacted portions of reagents comprising ammonia derivatives of the reagents. This molten mass, along with the excess ammonia, was then passed into the dehydration zone and there allowed to pass over the heated catalyst. The apparent contact time was 19 seconds. The temperature of the receiver was such as to cause the vaporous reaction products to condense therein. Ammonia and any other gaseous by-products passed from the system and the ammonia was separated and recycled to the catalytic zone. Proceeding in this manner, 15 g. of 1,4-cyclohexanedicarbonitrile (58 percent trans-1,4-cyclohexanedicarbonitrile) was collected in the receiver, representing a 90 percent yield and a 34 percent conversion.

The equipment described in this example may be employed for the one-step process (as in Examples IV, IX, and X) by introducing the raw material and ammonia directly into the catalytic zone through a suitably adapted port located just below that portion of the reactor previously referred to as the melt zone. In the event a reactor specifically designed for a one-step process is preferred, such an apparatus is shown and described in an article by Strickland and Bell in Industrial and Engineering Chemistry, vol. 53, page 7, January 1961.

EXAMPLE II

The process described in Example I was repeated with the exception that the 1,4-cyclohexanedicarboxylic acid was fed as a 20 percent solution of diammonium-1,4-cyclohexanedicarboxylate in aqueous ammonia. From this reaction, a 1,4-cyclohexanedicarbonitrile was obtained in a 76 percent yield and a 69 percent conversion based on the 1,4-cyclohexanedicarboxylic acid fed to the reactor.

EXAMPLE III

The process as described in Example I was repeated with the exception that the 1,4-cyclohexanedicarboxylic acid was fed as the solid diammonium salt of the 1,4-cyclohexanedicarboxylic acid. The 1,4-cyclohexanedicarbonitrile recovered from the reactor represented a 96 percent yield and a 92 percent conversion based on the 1,4-cyclohexanedicarboxylate fed.

EXAMPLE IV

The process as described in Example I was repeated with the exception that the 1,4-cyclohexanedicarboxylic acid was fed as the diamide of 1,4-cyclohexanedicarboxylic acid. The 1,4-cyclohexanedicarbonitrile recovered from the reactor represented a 95 percent yield and a 95 percent conversion based on the 1,4-cyclohexanedicarboxylic amide fed.

EXAMPLE V

A mixture of 15 g. of diammonium-1,4-cyclohexanedicarboxylate along with 1.5 g. of catalyst (Alcoa activated alumina, grade F-1, 4–8 mesh) was placed in a glass reactor and while passing anhydrous ammonia at a rate of 3 cc. per minute into the glass reactor, the entire reactor and reagents were heated to 300° C. for a period of 6 hours. From the reactor was recovered 8.9 g. of 1,4-cyclohexanedicarbonitrile representing an 89 percent yield and an 89 percent conversion based on the diammonium-1,4-cyclohexanedicarboxylate.

EXAMPLE VI

The process in Example V was repeated with the exception that the diammonium 1,4-cyclohexanedicarboxylate was replaced with 5 g. of 1,4-cyclohexanedicarboxamide. From the reactor was recovered 2.5 g. of 1,4-cyclohexanedicarbonitrile representing a 75 percent yield and a 49 percent conversion based on the 1,4-cyclohexanedicarboxamide.

EXAMPLE VII

The process described in Example V was repeated with the exception that the diammonium-1,4-cyclohexanedicarboxylate was replaced with 10 g. of mixed isomers of diammonium - 1,3-cyclohexanedicarboxylate. From the reactor was recovered 2.5 g. of 1,3-cyclohexanedicarbonitrile representing a 62 percent yield and a 38 percent conversion based on the 1,3-cyclohexanedicarboxylic acid added.

EXAMPLE VIII

Diammonium-1,4-cyclohexanedicarboxylic was fed at a rate of 0.048 mole per hour concurrently with anhydrous ammonia at a rate of 0.15 mole per hour into a reactor containing 30 g. of activated alumina which had been previously heated to 400° C. After 1.5 hours, 9.5 g. of 1,4-cyclohexanedicarbonitrile was collected representing a 98 percent yield and a 93 percent conversion based on the diammonium-1,4-cyclohexanedicarboxylate fed.

EXAMPLE IX

Two hundred and seventy-eight grams of dimethyl-1,4-cyclohexanedicarboxylate (80 percent cis isomer) was passed at a rate of 0.65 mole per hour concurrently with anhydrous ammonia introduced at a rate of 3.0 moles per hour over an activated alumina catalyst which has ben previously heated to 450° C. The apparent contact time as 2.4 seconds. 148 g. 1,4-cyclohexanedicarbonitrile (58 percent trans isomer) was obtained representing an 80 percent yield and a 95 percent conversion.

EXAMPLE X

One hundred two grams of 1,4-cyclohexanedicarboxamide was passed at a rate of 0.65 mole per hour concurrently with anhydrous ammonia introduced at a rate of 0.5 mole per hour over an activated alumina catalyst previously heated to 450° C. 60 g. of 1,4-cyclohexanedicarbonitrile was obtained representing an 80 percent yield.

EXAMPLE XI

A mixture of cis and trans isomers of 1,4-cyclohexanedicarboxylic acid introduced at a rate of 0.3 mole per hour concurrently with ammonia introduced at a rate of 6.0 moles per hour was passed over an activated alumina catalyst which had been previously heated to 400° C. There was obtained from the reaction an amount of 1,4-cyclohexanedicarbonitrile representing a 15 percent yield.

EXAMPLE XII

The process described in Example I was repeated with the exception that ammonium 1,4-cyclohexanedicarboxylate was added continuously with previously prepared 1,4-cyclohexanedicarbonitrile into the melt zone. By proceeding in this manner 1,4-cyclohexanedicarbonitrile was obtained in an 80 percent yield based on the diammonium 1,4-cyclohexanedicarboxylate fed.

It will be noted from the above description and examples that the reaction whereby 1,3- or 1,4-cyclohexanedicarbonitrile is formed is a vapor phase reaction and that the dicarbonitrile product is obtained in the form of vapor which is subsequently condensed to a solid state. The product in each case is a solid at room temperature.

1,4-cyclohexanedicarboxylic acid exists in two isomeric forms, and it has been determined that the cis isomer has the lower melting point and the trans isomer has the higher melting point. Likewise the derivatives of 1,4-cyclohexanedicarboxylic acid also exist as the corresponding cis and trans isomers. As set forth in our copending application Serial No. 292,782, filed July 3, 1963, now U.S. Patent 3,251,874 the advantages and benefits of obtaining 1,4-cyclohexanedicarbonitrile as largely as possible as the trans isomer is described. In accordance with the present invention, the equilibrium mixture of isomeric 1,4-cyclohexanedicarbonitrile containing 59 weight percent trans-1,4-cyclohexanedicarbonitrile and 41 weight percent cis-1,4-cyclohexanedicarbonitrile is obtained. A similar relationship exists with corresponding 1,3-cyclohexane derivatives.

It will be evident that we have by the present invention provided an extremely efficient process for the production in high yields of 1,3- or 1,4-cyclohexanedicarbonitriles which, as explained above, are useful as intermediates in the production of the 1,3- or 1,4-cyclohexanebis(methylamines) which themselves are valuable intermediates in the preparation of fiber-forming polyamides such as those disclosed in U.S. patent to Bell, Smith and Kibler No. 3,012,994. As indicated, excellent yields of these non-aromatic carbocyclic dinitriles are obtained by the process described and are obtained under conditions which do not destroy the product. Our process has the advantage that it is operable either batchwise or in a continuous manner with a wide range of starting materials which undergo the transformations described above to produce diamides which are converted to the dicarbonitrile products of the invention.

Although the invention has been described in considerable detail with particular reference to certain preferred embodiments thereof, variations and modifications can be effected within the spirit and scope of the invention as described hereinabove, and as defined in the appended claims.

We claim:
1. The process of preparing a cyclohexanedicarbonitrile which comprises contacting a compound selected from the group consisting of the diammonium salts, the diamides and the diesters of 1,3- and 1,4-cyclohexanedicarboxylic acid, in the presence of ammonia, with a dehydration catalyst at a temperature within the range of 300–485° C., whereby the corresponding dicarbonitrile of the acid is formed; said diamides and said diesters being volatile under about one atmosphere of pressure at said temperature.

2. The process of preparing a cyclohexanedicarbonitrile which comprises contacting a compound selected from the group consisting of the diammonium salts and the diamides of 1,3- or 1,4-cyclohexanedicarboxylic acid, in the presence of amomnia, with a dehydration catalyst at a temperature within the range of 300–485° C. whereby the corresponding dicarbonitrile of the acid is formed in the vapor phase and thereafter condensing the dicarbonitrile to the solid state; said diamides being volatile under about one atmosphere of pressure at said temperature.

3. The process of preparing a cyclohexanedicarbonitrile which comprises contacting a diamide selected from the group consisting of 1,3-cyclohexanedicarboxamide and 1,4-cyclohexanedicarboxamide, in the presence of ammonia, with a dehydration catalyst at a temperature within the range of 375–450° C. whereby the corresponding dicarbonitrile of the acid is formed.

4. The process of preparing 1,3-cyclohexanedicarbonitrile which comprises contacting 1,3-cyclohexanedicarboxamide, in the presence of ammonia, with a dehydration catalyst at a temperature within the range of 375–450° C.

5. The process of preparing 1,4-cyclohexanedicarbonitrile which comprises contacting 1,4-cyclohexanedicarboxamide, in the presence of ammonia, with a dehydration catalyst at a temperature within the range of 375–450° C.

6. The process of preparing a cyclohexanedicarbonitrile which comprises heating the diammonium salt of an acid selected from the group consisting of 1,3-cyclohexanedicarboxylic acid and 1,4-cyclohexanedicarboxylic acids, in the presence of ammonia, in a melting zone to a temperature within the range of 200–275° C. to form a molten mass thereof, thereafter conducting the molten mass to a catalytic zone and contacting the mass, in the presence of ammonia, with a dehydration catalyst at a temperature within the range of 300–485° C. whereby the corresponding dicarbonitrile of the acid is formed.

7. The process of preparing 1,3- or 1,4-cyclohexanedicarbonitriles which comprises heating the diammonium salt of an acid selected from the gorup consisting of 1,3-cyclohexanedicarboxylic acid and 1,4-cyclohexanedicarboxylic acids, respectively in the presence of ammonia, in a melting zone to a temperature within the range of 200° C. to 275° C. to form a molten mass thereof, thereafter conducting the molten mass to a catalytic zone and contacting the mass in the presence of ammonia with a dehydration catalyst at a temperature within the range of 300–485° C. whereby the dicarbonitrile is formed in the vapor phase and thereafter condensing the dicarbonitrile to the solid state.

8. The process of preparing a cyclohexanedicarbonitrile which comprises contacting an ester selected from the group consisting of the lower alkyl esters of 1,3- and 1,4-cyclohexanedicarboxylic acids, in the presence of ammonia, with a dehydration catalyst at a temperature within the range of 400–485° C., whereby the corresponding dicarbonitrile of the acid is formed; said esters being volatile under about one atmosphere of pressure at said temperature.

9. The process of preparing 1,3-cyclohexanedicarbonitrile which comprises contacting a lower alkyl ester of 1,3-cyclohexanedicarboxylic acid, in the presence of ammonia, with a dehydration catalyst at a temperature within the range of 400–485° C.

10. The process of preparing 1,4-cyclohexanedicarbonitrile which comprises contacting a lower alkyl ester of 1,4-cyclohexanedicarboxylic acid, in the presence of ammonia, with a dehydration catalyst at a temperature within the range of 400–485° C.

11. The process of preparing a cyclohexanedicarbonitrile selected from the group consisting of 1,3- and 1,4-cyclohexanedicarbonitriles which comprises heating the diammonium salt of an acid selected from the group consisting of 1,3- and 1,4-cyclohexanedicarboxylic acids, respectively, in previously prepared 1,3- or 1,4-cyclohexanedicarbonitrile, in the presence of ammonia, in a melting zone to a temperature within the range of 200–275° C. to form a molten mass thereof, thereafter conducting the molten mass to a catalytic zone and contacting the mass in the presence of ammonia with a dehydration catalyst at a temperature within the range of 300–485° C.

References Cited by the Examiner
UNITED STATES PATENTS

| | | | |
|---|---|---|---|
| 2,502,412 | 4/1950 | Ardis | 260—465.2 X |
| 2,800,496 | 7/1957 | Toland | 260—465.2 X |
| 2,808,426 | 10/1957 | Potts et al. | 260—465.2 |
| 2,955,130 | 10/1960 | Guyer et al. | 260—465.2 |
| 3,173,938 | 3/1965 | Hagemeyer et al. | 260—465.2 X |

OTHER REFERENCES

Malachowski et al.: Ber., 71, pp. 759–767 (1938).

CHARLES B. PARKER, *Primary Examiner.*
JOSEPH P. BRUST, *Examiner.*